April 11, 1939.  P. MÜLLER  2,154,279

BRAKING SYSTEM FOR DIESEL-ELECTRIC DRIVEN VEHICLES

Filed Oct. 27, 1937

WITNESSES:

INVENTOR
Paul Müller.
ATTORNEY

Patented Apr. 11, 1939

2,154,279

UNITED STATES PATENT OFFICE 2,154,279

BRAKING SYSTEM FOR DIESEL-ELECTRIC DRIVEN VEHICLES

Paul Müller, Berlin-Schoneberg, Germany, assignor to Westinghouse Electric & Manufacturing Company, East Pittsburgh, Pa., a corporation of Pennsylvania Application October 27, 1937, Serial No. 171,359
In Germany November 26, 1936

6 Claims. (Cl. 172—179)

The invention relates, generally, to Diesel vehicles with electrical power transmission and, more particularly, to electrical braking systems for such vehicles. Heretofore, such vehicles have been provided only with a purely mechanically-acting brake, particularly compressed air-brake, because it was desirable to avoid the complications of the circuit and the whole control which an electrical braking system requires. This is of particular importance in Diesel vehicles because, in general, very fast small vehicles are involved in which, as far as possible, every increase of the weight of the electrical equipment should be avoided.

An object of the invention is to provide for electrically braking Diesel-electric vehicles without appreciably increasing the weight of the electric equipment on the vehicle.

Another object of the invention is to provide for regulating the electrical braking force on a Diesel-electric vehicle.

A more specific object of the invention is to provide for utilizing the driving motor or motors of a Diesel-electric vehicle as an electrical brake by connecting the motor armature or armatures to a braking resistor and the motor field or fields to the main generator in such manner as to obtain a desired braking characteristic or curve.

Other objects of the invention will be explained fully hereinafter or will be apparent to those skilled in the art.

According to the invention, an advantageous electrical braking is attained in Diesel vehicles with electrical power transmission, without any considerable increase in the weight of the electrical equipment, by utilizing the Diesel-driven generator for the excitation of the motors which are connected to resistors during the braking operation.

Figure 1:
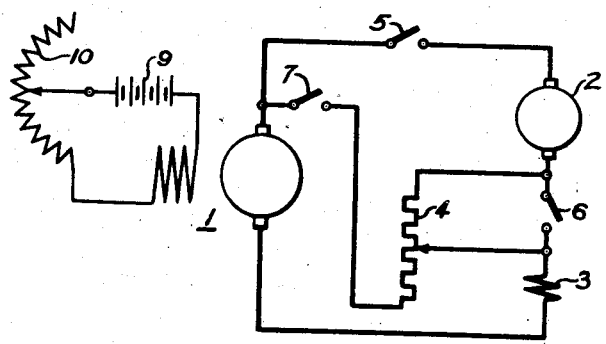
Figure 2:
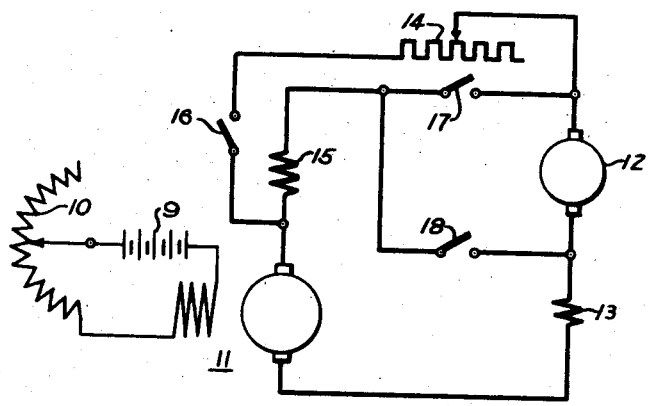

For a fuller understanding of the nature and objects of the invention, reference may be had to the following detailed description, taken in conjunction with the accompanying drawing, in which:

Figure 1 is a diagrammatic view of a control system embodying the invention; and Fig. 2 is a diagrammatic view of a modification of the invention shown in Fig. 1.

In Figure 1 of the drawing, an exemplary embodiment of the invention is illustrated. It is essential for the new braking circuit, which has auxiliary elements, that only a single resistor and two additional auxiliary switches are required. In the drawing, the numeral 1 identifies the main generator, which may be driven by a Diesel engine (not shown), 2 the vehicle motor, 3 the field winding of the vehicle motor 2, 4 the braking resistor and 5, 6 and 7 are switches. The switch 5 is the usual disconnecting switch which is always provided and which is opened when the drive is put out of operation.

By the operation of the auxiliary switch 7 one end of the resistor 4 is connected to one pole of the Diesel generator 1. The other end of the resistor 4 is connected to the junction point of the armature of the vehicle motor 2 and its field winding 3. In the latter connection, the switch 6 is coupled in addition. By the operation of the switch 6, the braking resistor 4 may be either wholly or partly short circuited.

For vehicle operation, the switches 5 and 6 are closed and the switch 7 is opened. As a result, current cannot flow through the braking resistor but only through the two armatures of the generator 1 and the motor 2 and the field winding 3. During braking operation, the switches 5 and 7 are closed and the switch 6 is opened. In this case, two dividing circuits result, the braking circuit for the armature of motor 2 and the exciting circuit for the field winding 3. The braking circuit may, as the drawing shows, be so connected in the vehicle motor circuit that during braking operation, the exciting current and the braking current in common flow through a portion of the braking resistor.

The potential of the main generator 1 is maintained constant since the generator is separately excited from a battery 9 or other suitable source. As a result, the potential drop in the portion of the resistor 4 through which the braking current and the field current flow together must remain approximately constant. Accordingly, if the braking current increases, then, since the sum of the braking current and the exciting current must remain constant, the exciting current, and with it the field strength, must decrease correspondingly. By suitable dimensioning of the resistance 4, any desired brake curve may be attained. To adjust selectively different braking forces, it is required that the braking resistance 4 be varied.

Also, for the purpose of adjusting different braking forces, the external excitation of the Diesel generator may preferably be regulated by means of a rheostat 10.

For the purpose of attaining at small speeds large braking forces, the braking resistance is partially, or wholly, short circuited.

If the generator is provided with counter-connected windings, then the circuit illustrated in Fig. 2 may also be selected. In this circuit, the braking current also flows through the counter-connected field winding and when the braking current increases, a weakening of the generator field takes place, the result of which is weaker excitation of the motor field so that the braking torque remains approximately constant over a large range of speeds.

In the circuit according to Fig. 2, the reference numeral 11 identifies the Diesel generator, 12 the vehicle motor having its armature connected in series with its field winding 13, 14 the braking resistor, 15 a counter-compound field winding of the Diesel generator 11, which is in addition also externally excited from the battery 9, and 16, 17 and 18 are three switches which are closed alternately during vehicle and braking operation.

During vehicle operation only the switch 17 is closed. In this case the current passes from the Diesel generator through its counter-compound field winding 15, the armature of motor 12 and the motor field winding 13. During braking operation, the switch 17 is opened and the switches 16 and 18 are closed. Two separate circuits then result, the exciting circuit and the braking circuit. The counter-compound field winding 15 is in both circuits during braking.

As the counter-compound field winding 15 is excited by the motor armature current during braking, an increase in the braking current effects a weakening of the generator field, which, in turn, results in a weaker excitation of the motor field, thereby reducing the braking current. In this manner the braking torque is so regulated that it remains approximately constant over a wide range of speed.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In an electrical braking system for Diesel-electric vehicles, in combination, a motor having an armature winding and a field winding, a generator for supplying current to the motor, a resistor connected in the motor armature circuit during braking, the field winding of the motor being excited by the generator during braking, and means energized by both the braking current and the exciting current for controlling the braking characteristics.

2. In an electrical braking system for Diesel-electric vehicles, in combination, a motor having an armature winding and a field winding, a generator for supplying current to the motor, switching means for opening the motor circuit, a resistor for regulating the motor current during braking, additional switching means for so connecting the resistor in the motor circuit that a separate braking circuit and a separate exciting circuit are established, the field winding of the motor being excited by the generator, and means common to both of said circuits for controlling the braking characteristics.

3. In an electrical braking system for Diesel-electric vehicles, in combination, a motor having an armature winding and a field winding, a generator for supplying current to the motor, a switch for opening the motor circuit, a resistor for regulating the motor current during braking, and a pair of additional switches for establishing the braking connections, one of said additional switches being disposed to connect one end of the resistor with one terminal of the generator, the other end of the resistor being connected between the field winding and the armature winding of the motor, the other additional switch being disposed to short circuit the resistor when closed and to remove said short circuit when opened.

4. In an electrical braking system for Diesel-electric vehicles, in combination, a motor having an armature winding and a field winding, a generator for supplying current to the motor, switching means for opening the motor circuit, a resistor for regulating the motor current during braking, and additional switching means for so connecting the resistor in the motor circuit that a separate braking circuit and a separate exciting circuit are established, the field winding of the motor being excited by the generator, a portion of said resistor being connected in both the armature circuit and the field exciting circuit for the motor during braking.

5. In an electrical braking system for Diesel-electric vehicles, in combination, a motor having an armature winding and a field winding, a generator for supplying current to the motor, said generator having a counter-compound field winding, and a resistor connected in the motor armature circuit during braking, the field winding of the motor being excited by the generator and said counter-compound field winding being connected in the motor armature circuit during braking, thereby effecting a weakening of the generator field when the braking current increases.

6. In an electrical braking system for Diesel-electric vehicles, in combination, a motor having an armature winding and a field winding, a generator for supplying current to the motor, said generator having a counter-compound field winding, a resistor for controlling the motor current, switching means for connecting the resistor in the motor armature circuit during braking, the field winding of the motor being excited by the generator during braking, and additional switching means for connecting said counter-compound field winding in the motor armature circuit during braking, thereby effecting a weakening of the generator field when the braking current increases.

PAUL MÜLLER.